March 20, 1962 A. B. SEGUR 3,025,979
SYSTEM OF HANDLING BRICK AND SIMILAR ARTICLES
Original Filed Nov. 4, 1952 11 Sheets-Sheet 1

March 20, 1962 A. B. SEGUR 3,025,979
SYSTEM OF HANDLING BRICK AND SIMILAR ARTICLES
Original Filed Nov. 4, 1952 11 Sheets-Sheet 3

Fig. 3 b

INVENTOR.
Asa B. Segur
BY
Mann, Brown and Hausmann
Attys.

March 20, 1962 A. B. SEGUR 3,025,979
SYSTEM OF HANDLING BRICK AND SIMILAR ARTICLES
Original Filed Nov. 4, 1952 11 Sheets-Sheet 6

Fig. 8

INVENTOR.
Asa B. Segur
BY
Mann, Brown and Hausman
Attys.

March 20, 1962 A. B. SEGUR 3,025,979
SYSTEM OF HANDLING BRICK AND SIMILAR ARTICLES
Original Filed Nov. 4, 1952 11 Sheets-Sheet 7

INVENTOR.
Asa B. Segur
BY
Mann, Brown and Hausmann
Attys.

March 20, 1962 A. B. SEGUR 3,025,979
SYSTEM OF HANDLING BRICK AND SIMILAR ARTICLES
Original Filed Nov. 4, 1952 11 Sheets-Sheet 8

INVENTOR.
Asa B. Segur
BY
Mann, Brown and Hausmann
attys.

March 20, 1962 A. B. SEGUR 3,025,979
SYSTEM OF HANDLING BRICK AND SIMILAR ARTICLES
Original Filed Nov. 4, 1952 11 Sheets-Sheet 11

INVENTOR.
Asa B. Segur
BY
Mann, Brown and Hausmann
Attys.

United States Patent Office 3,025,979
Patented Mar. 20, 1962

3,025,979
SYSTEM OF HANDLING BRICK AND SIMILAR ARTICLES
Asa B. Segur, 1181 S. Ridgeland Ave., Oak Park, Ill.
Continuation of Ser. No. 539,229, Oct. 6, 1955, which is a division of Ser. No. 318,554, filed Nov. 4, 1952, now Patent No. 2,748,957, dated June 5, 1956. This application Mar. 13, 1959, Ser. No. 799,383
10 Claims. (Cl. 214—8.5)

This application is a continuation of divisional application Serial No. 539,229, filed October 6, 1955, now abandoned, the parent case of which is application Serial No. 318,554, now U.S. Patent 2,748,957.

This invention relates to a system for handling brick and similar articles and, more particularly, to apparatus and method for drawing brick from a kiln tunnel car or the like and storing them or loading them for transportation from the brick yard.

In order to load selected brick from a kiln to a customer's conveyance by means in common use in the industry, it is necessary for an operator to place himself in close proximity to the brick to be unloaded. In this position he will on rare occasions be able to move the brick from the kiln direct to customer's conveyance. Much more often, however, he must pitch these brick to a second operator, who will place them in the customer's conveyance.

Many times it is necessary to sort out certain types of brick which are held in separate classifications for other purposes than those in the main load. In these cases the operator must generally walk to the location for these particular brick to dispose of them; or he may pitch the brick to another man who is waiting to receive these special brick or store them nearby to be picked up later for transfer to the final location. It is not at all unusual for a single set of brick to be handled as much as four or five times before it reaches its destination in the proper grouping for materials of this kind.

Thus one disadvantage of systems of drawing brick now in use is the large amount of extra handling of the brick which is required. All this extra handling is very expensive, as is obvious from the fact that the number of people generally used to handle this material is from three to eight times the number required when the system of the present invention is used.

Another difficulty with prior art methods is that the operator's eyes must keep track of the location of the brick, tile or other materials both at the position they are to be picked up and at the location in which they are to be placed. The operator must look at the source of supply to determine where the material is that is to be picked up. He must then pick the material up. Then he must turn to the point of disposal. Here he must again watch the point at which the material is to be placed. Finally, he must dispose of the material. By the time the operator turns to pick up the next load of material, he has lost track of the location from his first operation and must re-establish his position on the load again. Furthermore, if there is special material to be sorted out, the operator cannot keep track of this material to be sorted when he must continually move his eyes from supply source to disposal area.

In the present invention, the operator's eyes never leave the source of material to be sorted. There is always a point of disposal immediately at hand where he can lay down special material. He does not need to move his eyes to locate the point of final disposal. The amount of eye time saved per thousand brick or tile has been found to be very great.

The apparatus of this invention comprises means for providing stacks of articles within convenient reach of an operator platform whose elevation in relation to the stack tops is preferably maintained substantially constant as the stacks are unloaded; and a conveyor for moving articles away from said platforms after the articles have been unloaded from the stacks. The area through which the conveyor passes is located between the operator position and the stack position so that the stacked articles are presented at the operator platform in a manner requiring a minimum of eye and body movements by the operator during unloading.

The preferred embodiment of this invention includes accumulating means for causing the articles to bump together in compact groups as they reach the end of the conveyor; means for automatically removing from the accumulating means a predetermined quantity of articles; and a chute for moving the articles to a final loading station where an unloading tongs may be lowered automatically into a position in which it can engage a predetermined number of articles to transfer them to the vehicle or other ultimate destination of the articles.

Other features of the invention include means for conveniently removing special categories of articles from the conveyor means, and means for selectively locating a vehicle to be loaded by the tongs so that the tongs automatically place the articles in their proper position upon the vehicle.

My invention will be described by reference to the embodiments shown in the accompanying drawings.

In the drawings:
FIGS. 4a and 4b together constitute a side-elevational view of the apparatus shown in FIGS. 3a and 3b;
FIG. 5 is a partial vertical sectional view on an enlarged scale taken on the line 5—5 of FIG. 3a;
FIG. 6 is a view similar to FIG. 5 but is taken on the line 6—6 of FIG. 3a;
FIG. 7 is a transverse vertical sectional view on an enlarged scale taken on the line 7—7 of FIG. 3a;
FIG. 8 is an enlarged end view looking in the direction of the arrow 8 in FIG. 4a;
FIG. 9 is an enlarged view of the left-hand end of the mechanism shown in FIG. 3a;
FIG. 10 is a partial transverse vertical sectional view on an enlarged scale taken on the line 10—10 of FIG. 9.

Figures 1, 2:
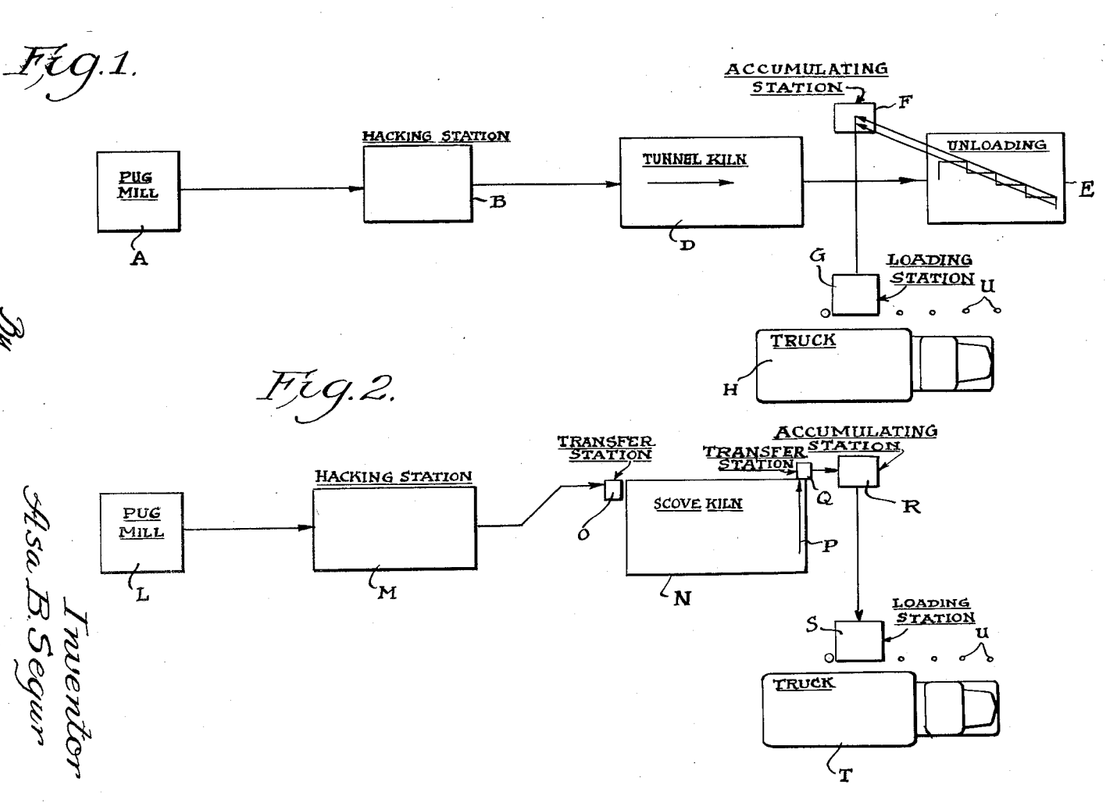
FIG. 1 is a schematic diagram illustrating the apparatus employed in one form of a system of hacking and drawing brick in which the present invention may be included.
FIG. 2 is a view similar to FIG. 1 illustrating a modified form of the system of handling brick and other articles which is shown in the former figure.

In the schematic diagram of FIG. 1, I have indicated the various operating steps and apparatus therefor, showing generally the transfer of the brick or other like material from one piece of apparatus to another. In general I have shown a source such as a pug mill A from which the brick blanks are transported by a suitable conveyor to a hacking station B where the blanks are stacked in predetermined patterns upon cars which carry the blanks thus stacked through a tunnel kiln D. In this kiln the blanks are fired and converted into brick which the cars then transport to a drawing or unloading station E where the brick is unloaded onto conveyors which conduct it to an accumulating station F. Here the brick is consolidated into a broad stream delivered to a loading station G where tongs carried by a movable crane pick up large groups of brick and load them upon a motor truck H or other transportation vehicle.

In FIG. 2 I have shown a modification of my system wherein the brick blanks formed in the pug mill L are transported to a hacking station M where the blanks are loaded upon cars which transport the blanks to a scove kiln N. Here a crane or other suitable transfer means removes the blanks from the cars and stacks them in the scove kiln. This operation is indicated by the transfer station O. After the blanks have been suitably fired and cured in the scove kiln, they may be unstacked and placed upon a conveyor indicated by the arrow P and transported to a transfer station Q from whence they are conducted to an accumulating station R and thence delivered to a loading station S for loading on a truck T or other suitable conveyance. The loading stations G and S are illustrated as being provided with guides U for predetermined different positions of the truck during the loading operation.

Figure 3A:
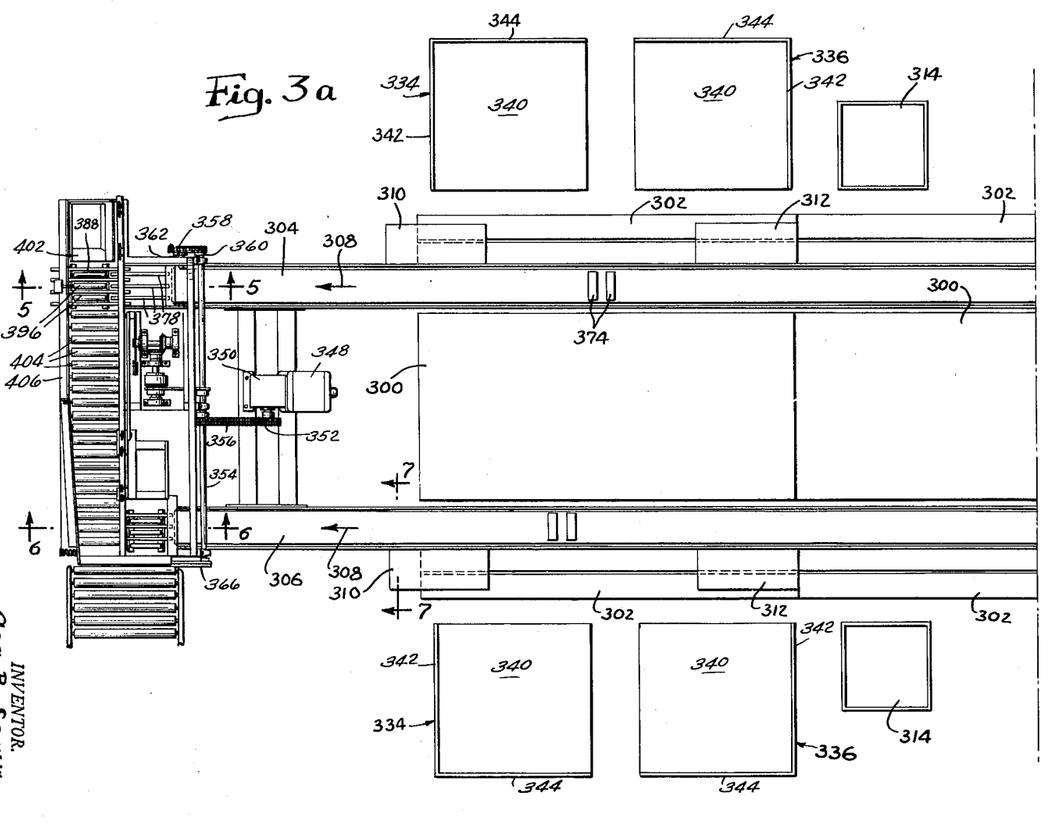
FIGS. 3a and 3b together illustrate a new and improved station for unloading tunnel kiln cars and novel apparatus for accumulating the brick therefrom preparatory to loading it onto motor trucks and other commercial transportation vehicles.

In FIGS. 3a and b and 4a and b I have shown in plan and side elevation, respectively, an unloading or drawing station for tunnel kiln cars. The cars having a plurality of rows of cured or burned brick stacked in a plurality of layers are delivered from the tunnel kiln to the left-hand end of the unloading station as viewed in these figures, which show a series of four cars 300. It is contemplated that two or four workmen will be employed to unload the cars, half of the workmen being located on each side of the cars. I further contemplate that as the layers of brick are removed from the cars, the cars are moved toward the right in these figures, and I have provided platforms 302 on opposite sides of the three left-hand cars, these platforms being arranged at different heights so that men standing thereon can unload at the most convenient height. The right-hand car 300 can be unloaded by men standing at ground level. It will be understood, therefore, that the term "platform," as used in the appended claims, is intended to include the ground.

On opposite sides of the cars 300 are conveyors 304 and 306 of the endless belt type. The upper flight of each of these conveyors constitutes a movable transport surface that travels toward the left as viewed in these figures and as indicated by the arrows 308. It will be further noted that the conveyors 304 and 306 are inclined upwardly so that opposite each car to be unloaded they are at the most convenient height for the men unloading such cars. In the particular layout shown in FIGS. 3a and b and 4a and b I contemplate that the unloading operation will be conducted by two men who will start unloading operations by standing on the leftmost platforms 302 between the movable trays 310 and 312. When a car first comes from the kiln it is positioned opposite these platforms and the upper layers of brick are unloaded at this point.

Figure 4A:
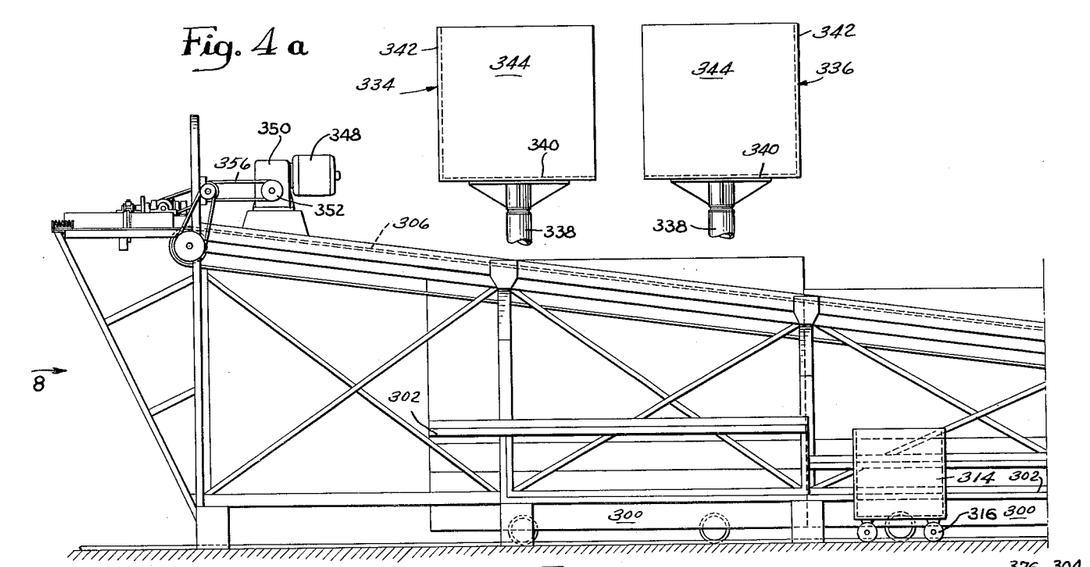
Figures 4B, 6, 7:
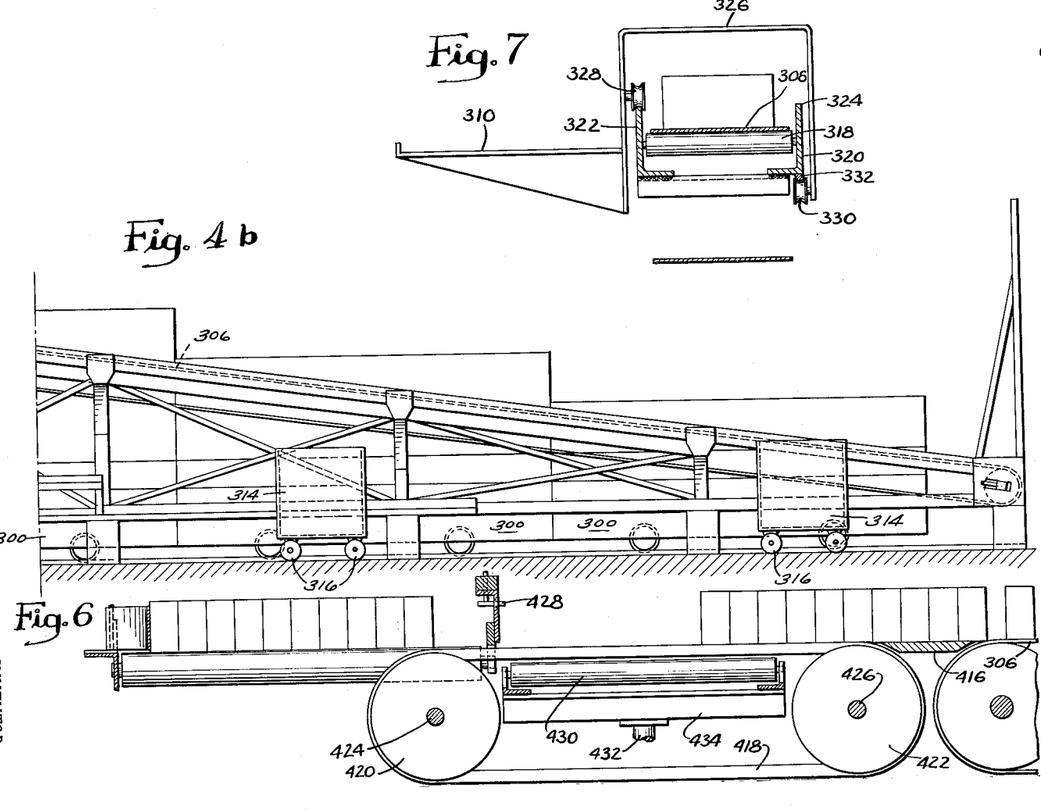

Since the men are standing on elevated platforms and the conveyors 304 and 306 are located at a convenient height between these men and the cars to be unloaded, it is a very simple, efficient, and relatively untiring operation to pull the upper layers of brick from the car onto the conveyor belts, and this arrangement facilitates quick and inexpensive unloading with no appreciable damage to the brick being unloaded. Some of the brick unloaded from the tunnel kiln cars are of exceptionally high quality, and these are placed upon the trays 310 instead of upon the conveyor belts. A slightly lesser quality but still high-quality brick is also separated out and placed upon the trays 312, whereas damaged, malformed, or improperly cured brick are thrown into the carts 314 which may be supported on rollers 316 as shown in FIGS. 4a and b. The remainder of the brick is placed upon the conveyor belts, and this remainder constitutes by far the greatest bulk of the brick unloaded.

The best or face edges of the brick are formed where two bricks are stacked directly one upon the other, and in placing the bricks upon the conveyor belts 304 and 306 it is desirable to have all of these face edges upwardly. Since some of these face edges are downwardly as the brick is stacked upon the cars, it is necessary for the workmen to turn the brick over as they are placed upon the conveyor belts, and I shall now describe the means whereby this turning over of the brick is facilitated.

Referring to FIG. 7 it will be seen that the conveyor belts 304 and 306 are supported on rollers 318 carried by side frames 320 and 322. The side frame 320 has an upper edge 324 located slightly above the upper reach of the belt 306 so that in transferring a brick from the car to the belt, the near end of the brick is pulled into contact with this edge 324 and the brick then rolled over into upside down position on the belt 306. It also will be noted that the frame 322 extends upwardly above the upper flight of the belt 306 and forms a backstop which prevents the workmen from pulling the brick too far.

This FIG. 7 illustrates a form of mounting which can be used for the movable trays 310 and 312. Each tray is provided with a pair of straps 326 extending across its associated conveyor belt. Each strap 326 carries grooved rollers 328 and 330. The roller 328 rides on the upper edge of frame member 322, whereas roller 330 rides on a bead 332 welded or otherwise attached below the other side frame members 320. Any suitable braking means (not shown) may be provided to cause these trays to stay in the positions to which they are shifted by the workmen instead of rolling down the inclined tracks on which they are supported.

After the men have removed the upper layers of the leftmost car, this car is shifted to the next position and a fully loaded car takes its place. The workmen may then shift their trays 310 and 312 to the position opposite the shifted car and there remove the next few layers. This operation is repeated twice more to completely unload the car.

When one of the trays 310 becomes substantially filled with the highest quality brick, a workman moves this tray to a position opposite his palletizing unit 334 and carefully stacks the brick in this unit. Likewise, when a tray 312 becomes substantially filled, a workman moves this tray to a position adjacent his palletizing unit 336 and carefully stacks the brick in such unit. It will be noted that these palletizing units are conveniently mounted on posts 338 so that the units are at the most efficient height for transfer of brick from the trays to the units.

Each of the palletizing units 334 and 336 is preferably of welded steel construction and comprises a bottom 340 and two sides 342 and 344. These units are rotatable on the posts 338 (see FIG. 4a) and are normally positioned as shown in FIG. 3a. When the palletizing units become filled they are rotated so that the open sides face outwardly to permit a crane, fork truck, or similar unloading device to remove the brick therefrom. In stacking the brick in these units, the workmen preferably arrange the lowermost layer to permit insertion of the crane fingers so that the entire stack of brick can be removed and transported as a unit.

Figure 8:
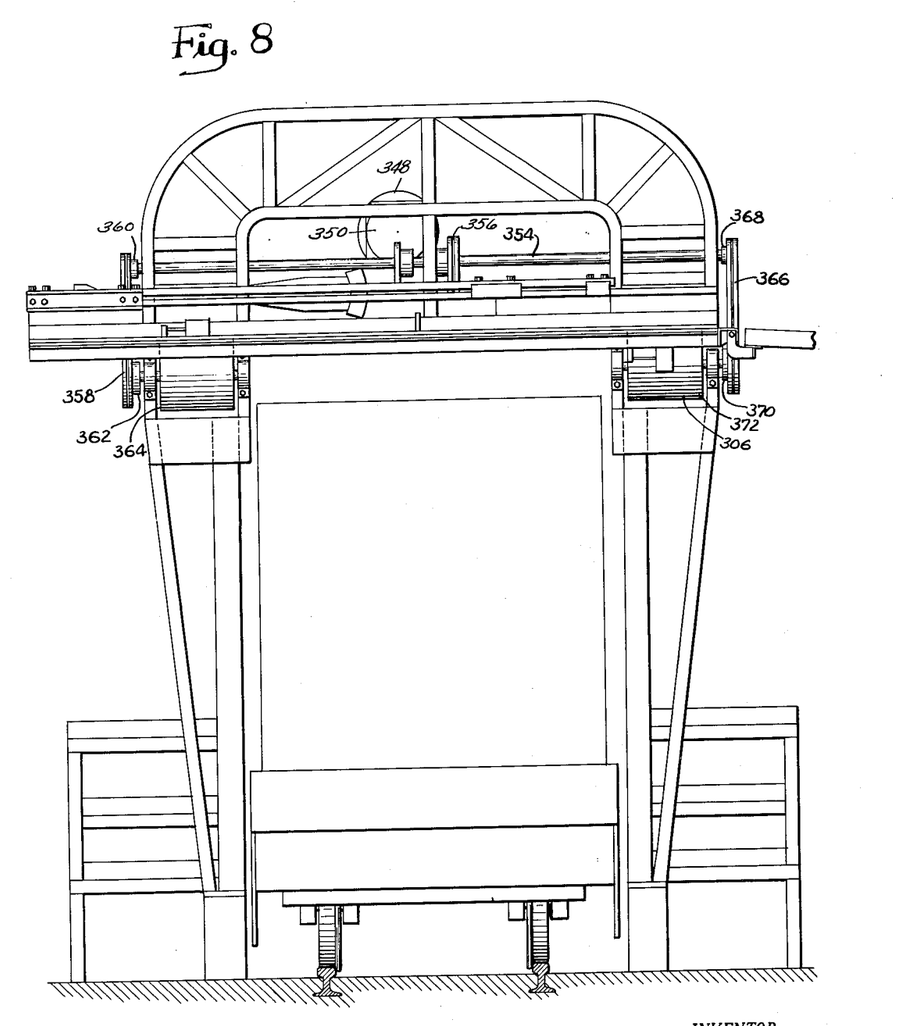

The conveyor belts 304 and 306 are driven by an electric motor 348 having reduction gearing 350 driving a pulley 352. As shown in FIG. 8, this pulley drives cross shaft 354 through belt 356, and belt 358 connects pulley 360 on one end of the shaft 354 with a pulley 362 on a shaft carrying the roller 364 for the conveyor belt 304. A belt 366 connects a pulley 368 at the other end of shaft 354 with a pulley 370 on the shaft of roller 372, which drives conveyor belt 306.

Figure 5:
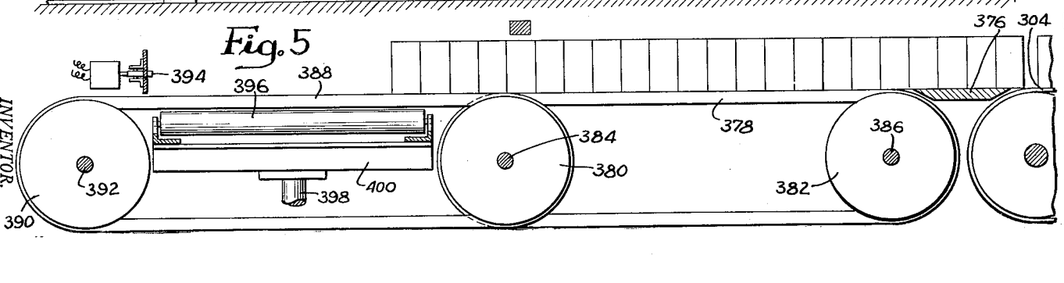
Figures 9, 10:
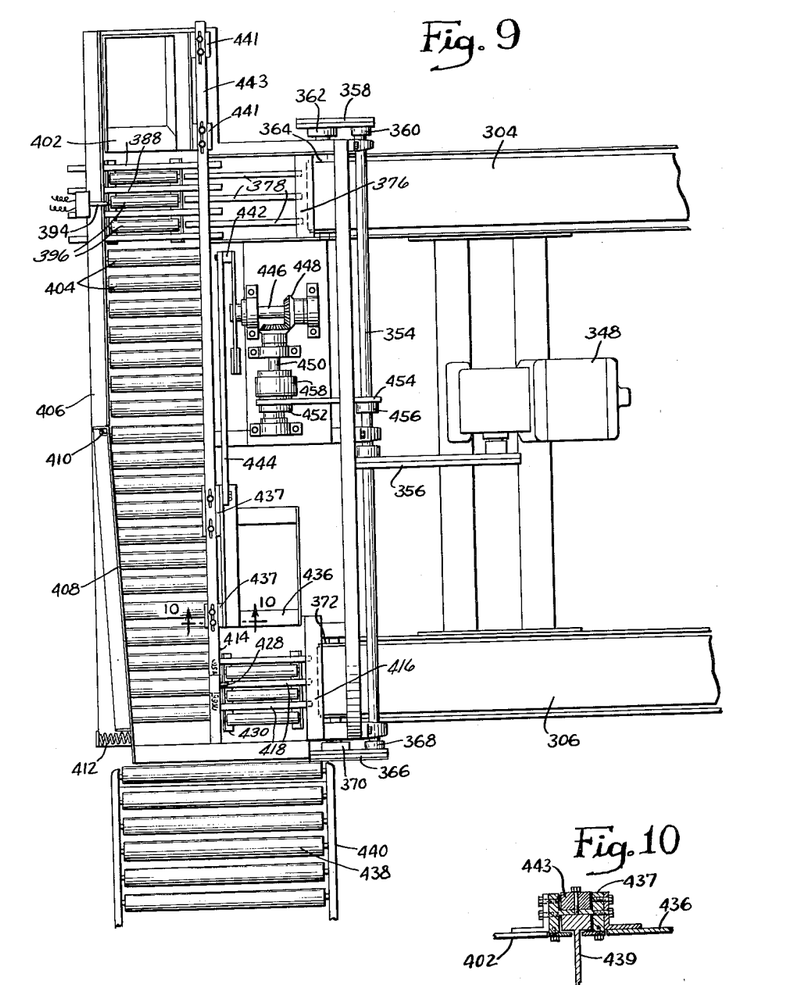

The bricks are placed upon the conveyors 304 and 306 for travel in a sidewise direction as indicated at 374. These conveyors conduct the bricks to accumulating means located at the left-hand end of FIGS. 3a and 4a for consolidating the streams of brick from the two conveyors into a single continuous but slower moving stream of brick in which the bricks are arranged twenty abreast and move in an endwise direction. This accumulating means is shown on a larger scale in plan view in FIG. 9 and in vertical sections in FIGS. 5 and 6. Referring to FIGS. 5 and 9, it will be seen that the bricks from the conveyor 304 pass over a narrow stationary plate 376 and onto a short conveyor comprising a plurality of spaced narrow belts 378 passing around the pulleys 380 and 382 mounted on shafts 384 and 386 respectively. The pulleys 380 and 382 rotate freely so that the belts 378 provide a freely movable brick-supporting surface that is driven by the brick discharged from the conveyor 304. This arrangement has the advantage of producing a solid column of brick, as clearly indicated in FIG. 5. From the belts 378 the bricks pass to still another conveying means consisting of a plurality of spaced belts 388 which alternate with the belts 378 and pass around pulleys on the shaft 384 between the pulleys 380 carrying the belts 378. The belts 388 also pass around a series of idler pulleys 390 on a shaft 392 so that the belts 388 provide a freely movable brick-supporting surface that is driven by the bricks pushed thereon.

A switch 394 is positioned to be contacted by the advancing column of brick discharged from the conveyor 304, and when this switch is contacted, two things happen. The idler rollers 396, which normally are positioned below the spaces between belts 388, are raised to lift the brick thereabove off the belts 388. This is accomplished by a hydraulic actuator 398 or other suitable means for raising the frame 400 serving as a support for the rollers 396. As soon as the brick rest upon the raised rollers 396, an ejector 402 is advanced to push a column of ten bricks endwise into the rollers 404 of a transverse conveyor 406. The bricks are moved along this conveyor by the operation of ejector 402 as it pushes successive columns of ten bricks into this conveyor, so that the action of this ejector is to produce a continuous but slowly advancing stream of brick ten bricks wide. The lower end of the conveyor 406, as viewed in FIG. 9, is provided with a plate 408 pivoted at 410 and actuated by a spring 412 to urge the brick transversing this conveyor toward the wall 414.

Referring to FIG. 6, it will be seen that the bricks delivered by the conveyor 306 pass over a narrow fixed plate 416 and then onto a series of spaced narrow belts 418 passing over idler pulleys 420 and 422 on shafts 424 and 426, respectively. The shafts 424 and 426 are adapted to rotate freely, and the belts 418 provide a freely movable brick-supporting surface that is driven by the bricks delivered by the conveyor 306 so that the bricks form a close column on these belts, as clearly shown in FIG. 6. A second microswitch 428 is positioned to be engaged by the bricks delivered from the conveyor 306, and when this switch is operated, the rollers 430 are moved upwardly between the belts 418 to lift the brick therefrom. The rollers 430 are raised by a fluid cylinder 432 or other actuator attached to the frame 434 which supports the rollers 430.

A second ejector 436 serves to push a column of bricks ten bricks wide from the rollers 430 onto the rollers 438 of a chute 440 having a width capable of receiving a column of bricks which is twenty bricks wide. This chute 440 also receives the column of bricks advanced by the ejector 402. The extreme forward or ejecting positions of the ejectors 402 and 436 are spaced apart a distance which is a multiple of the length of the bricks, so that the transverse rows of brick supplied by the two ejectors are in alignment when delivered to the chute 440.

Any suitable means may be provided for operating the ejectors 402 and 436, but in the particular embodiment shown in FIG. 9, these ejectors are operated by a crank 442 attached by link 444 to the ejector 436. The ejector 436 is attached to two H-members 437 which slide on a track 439 (shown in FIG. 10). The ejector 402 is also attached to two H-members 441 which likewise slide on track 439. A bar 443 adjustably connects the four H-members so that the two ejectors or plungers reciprocate in unison. The crank 442 is on a shaft 446 driven by bevel gearing 448 from a shaft 450 having a pulley 452 connected by belt 454 with a pulley 456 on the conveyor driving cross shaft 354. A clutch 458 is interposed between pulley 452 and shaft 450, and this clutch is under the joint control of microswitches 428 and 394 so that the ejectors 402 and 436 operate simultaneously and only when both microswitches 394 and 428 are contacted by streams of brick delivered by their conveyors 304 and 306, respectively.

Figures 11, 12:
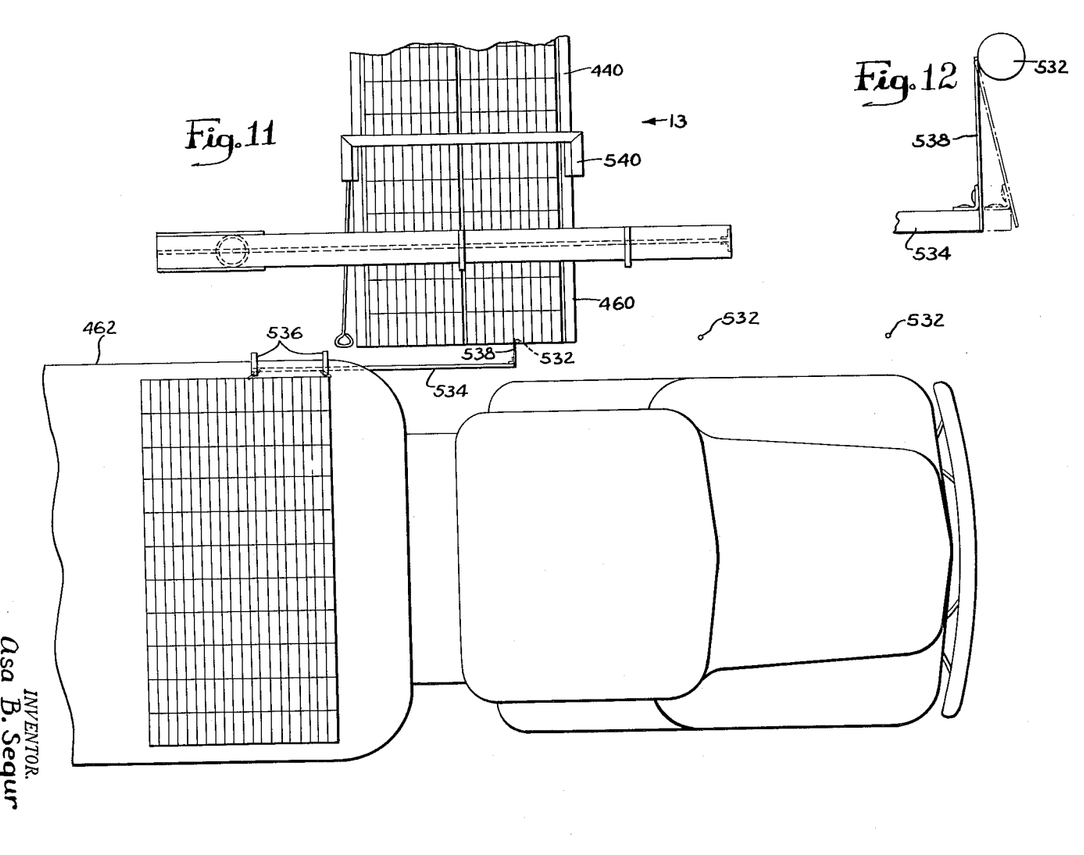
FIG. 11 is a top plan view illustrating the loading of a motor truck with bricks from a novel loading station.
FIG. 12 is an enlarged view of a detail of the positioning guide attached to the truck body.
Figures 13, 17:
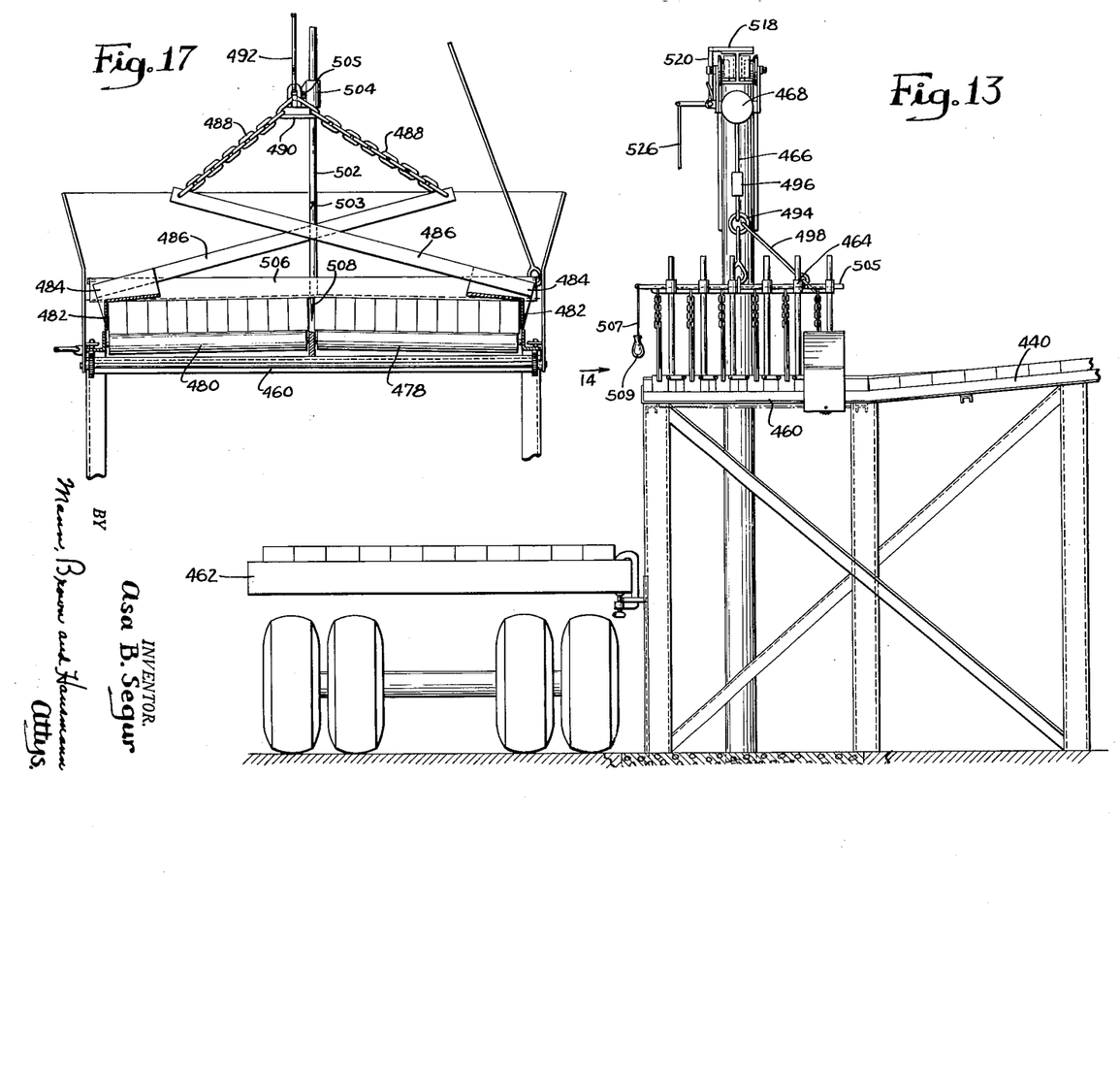
FIG. 13 is a side view of the loading station of FIG. 11 looking in the direction of the arrow 13 of FIG. 11.
FIG. 17 is a view looking in the direction of the arrow 17 in FIG. 15.

Referring to FIGS. 11 and 13, it will be seen that the chute 440 is preferably inclined, as best shown in the latter figure, and delivers the brick to a loading platform 460 from which the brick are transferred in large groups to a trailer truck 462 or other suitable conveyance. In lieu of conducting the brick to a loading platform 460, the chute 440 may be provided with oppositely curved ends which split the column of bricks into two narrow columns of ten bricks each and deliver such narrow columns to the opposite ends of a railroad car for stacking therein. In the particular embodiment shown, however, I have provided novel apparatus for quickly and efficiently loading motor trucks and similar vehicles.

This means comprises multiple tongs 464 supported by cables 466 of the electric motor-driven winch 468 mounted on a trolley 470 of a jib crane 472. The arm 474 of the jib crane 472 is pivotally mounted about the axis of its supporting post 476 whereby the arm may be swung from a position over the loading platform 460 through an arc of approximately 90° to a position over and transversely of the body of the motor truck.

Referring more particularly to FIG. 17, it will be seen that the loading platform 460 has two series of brick-supporting rollers 478 and 480 having their axes slightly inclined with respect to each other so that the transverse rows of bricks are supported on the platform in a broad arch or V with a gap between the center bricks. The multiple or gang tongs 464 are illustrated as being composed of six individual sections, each adapted to grip and lift a row of twenty bricks so that a total of one hundred twenty bricks may be quickly and easily transferred from the loading platform to the body of the truck at one operation. Each section of the tongs comprises opposed gripping jaws 482 mounted on pivots 484 carried by the tongs frame and attached to arms 486 connected by chains 488 to a common cross member 490. A link 492 connects the cross member 490 to an eye 494 carried in a hook 496 attached to the end of the cables 466. Bracing links 498 and 500 are provided to control tilting of the tongs in perpendicular directions, and guide rods 502 are attached at their lower ends to the frame of the tongs and have upper ends sliding in sleeves 504 attached to cross member 490. The transverse frame members 506 have their brick-engaging surfaces arched upwardly to conform to the positioning of the bricks on the rollers 478 and 480 and a divider 508 is attached to and projects downwardly from each frame cross member 506. The rods 502 are provided with notches 503 for receiving a latch rod 505 when the tongs are lowered to release their load. This latching mechanism permits the tongs to be raised without again picking up the released load. A lanyard 507 terminating in a hand grip 509 may be pulled to release the latch and thereby condition the tongs for taking up a new load. Further description of the tongs 464 is deemed unnecessary since these tongs are disclosed and claimed in my application Serial No. 319,507, filed November 8, 1952, copending with the aforementioned U.S. Patent 2,748,957 and now matured into U.S. Patent 2,738,216.

Figure 14:
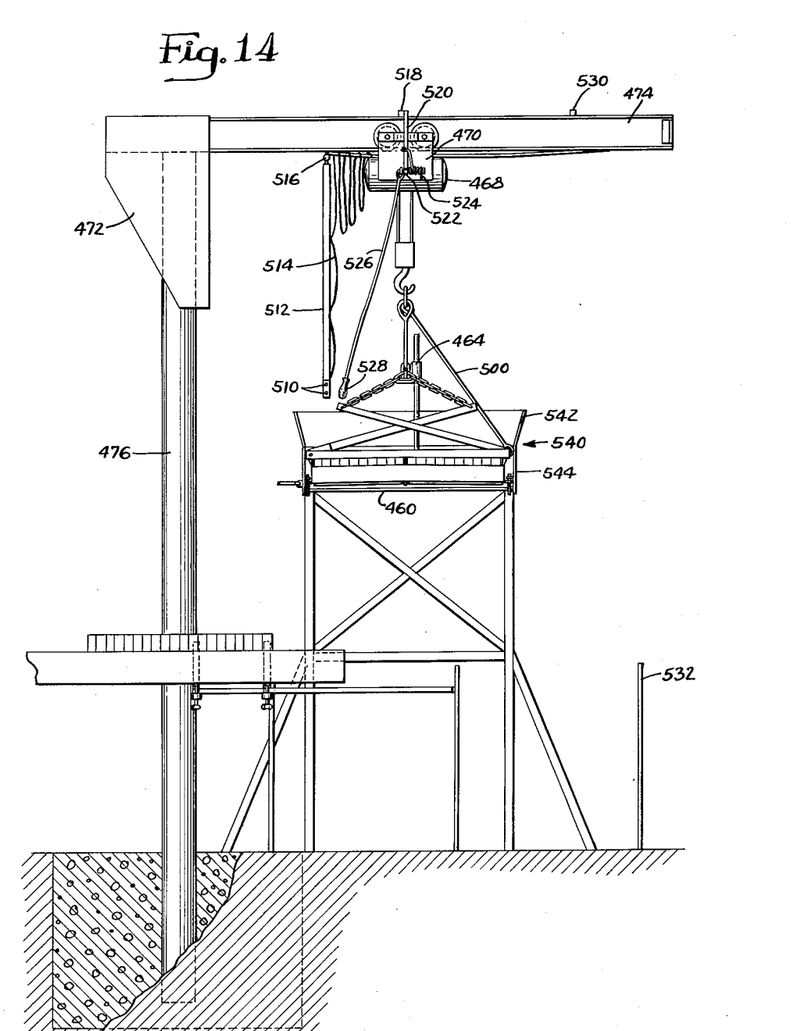
FIG. 14 is a view of the apparatus shown in FIG. 13 but looking in the direction of the arrow 14 of FIG. 13.

The electric winch 468 is controlled to raise and lower the tongs and any brick supported therein by buttons 510 positioned at the lower end of an arm 512 and connected to the winch motor by an electric cable 514 which is of sufficient length to provide for movement of the trolley 470 lengthwise of the crane arm 474. The arm 512 is pivotally attached to the crane arm 474 at 516 in such manner that a pull on the arm 512 can be exerted to pull the crane arm back and forth between positions over the loading platform and positions over the motor truck body. FIGURE 14 shows the positioning of the trolley 470 when the tongs 464 are gripping or about to grip a load of bricks on the loading platform 460. In this position of the trolley, the stop 518 on the crane arm 474 is engaged by the upper end of a bell crank lever 520. This bell crank lever is pivoted at 522 and a spring 524 normally holds the lever in stop-engaging position. A cord 526 and hand grip 528 are attached to the lower arm of the lever, whereby a pull on the hand grip will move the lever out of stop-engaging position. In loading the near side of the truck body the trolley 470 remains in the position shown in FIG. 14. In order to load the far side of the truck body, the trolley is moved outwardly on the arm 474 until the bell crank lever 520 engages the stop 530. In the ordinary loading operation the trolley 470 moves only between the two positions defined by these stops.

It is most important that the truck body be accurately positioned and advanced step-by-step in order to secure maximum speed and efficiency, and I shall now describe the means whereby this is accomplished. Adjacent the loading station is a series of posts 532 which are accurately spaced and serve as guides for successive positions of the motor truck. A marker 534 is temporarily attached to the motor truck body by clamps 536, and this marker has a resiliently supported finger 538 (FIG. 12) adapted to contact the posts 532. The pole-engaging end of the marker 534 extends to a point adjacent the side of the cab of the motor truck where it may be readily seen by the driver so that he can tell when the finger 538 engages a pole 532 and, therefore, when his truck is in proper position.

FIGURE 11 shows the initial loading position of the motor truck and the position assumed by the first two groups of brick transferred thereto by the tongs 464. It will be noted that a truck body of standard dimensions will take only eleven rows of brick crosswise of the truck, whereas the gang tongs are designed to pick up six rows. This means that in the first load the gang tongs transfer six rows whereas in the second load only five rows can be picked up. This is accomplished by having the last section of the gang tongs overhang the edge of the loading platform so that they do not grip and pick up any brick. The truck remains in the position shown in FIG. 11 until the desired number of layers of brick have been piled upon this section of the truck body. The truck is then advanced until the finger of the marker 534 engages the next pole 532, the resilient mounting of the finger permitting it to flex around the individual poles without injury. With the truck in the second loading position, a new tier of brick extending completely crosswise of the truck body is built up immediately in the rear of the first tier. The truck body is then moved to a third position and the process repeated. The distance between the poles 532 is equal to twenty times the thickness of a brick, except that the distance between the last two poles is only one-half this for a reason to be hereinafter explained. In order to facilitate locating of the gang tongs over the brick on the loading platform, I preferably provide a U-shaped guide 540 for the tongs. This guide has an outwardly flaring upper edge 542 which helps direct the tongs into the vertical lower portion 544 of the guide, wherein the tongs are accurately positioned above the transverse rows of brick on the loading platform. The tongs, however, sometimes take six rows of twenty bricks and at other times take only five rows so that I have provided means for adjusting the guide 540 with both of these requirements of the tongs.

Figures 15, 16:
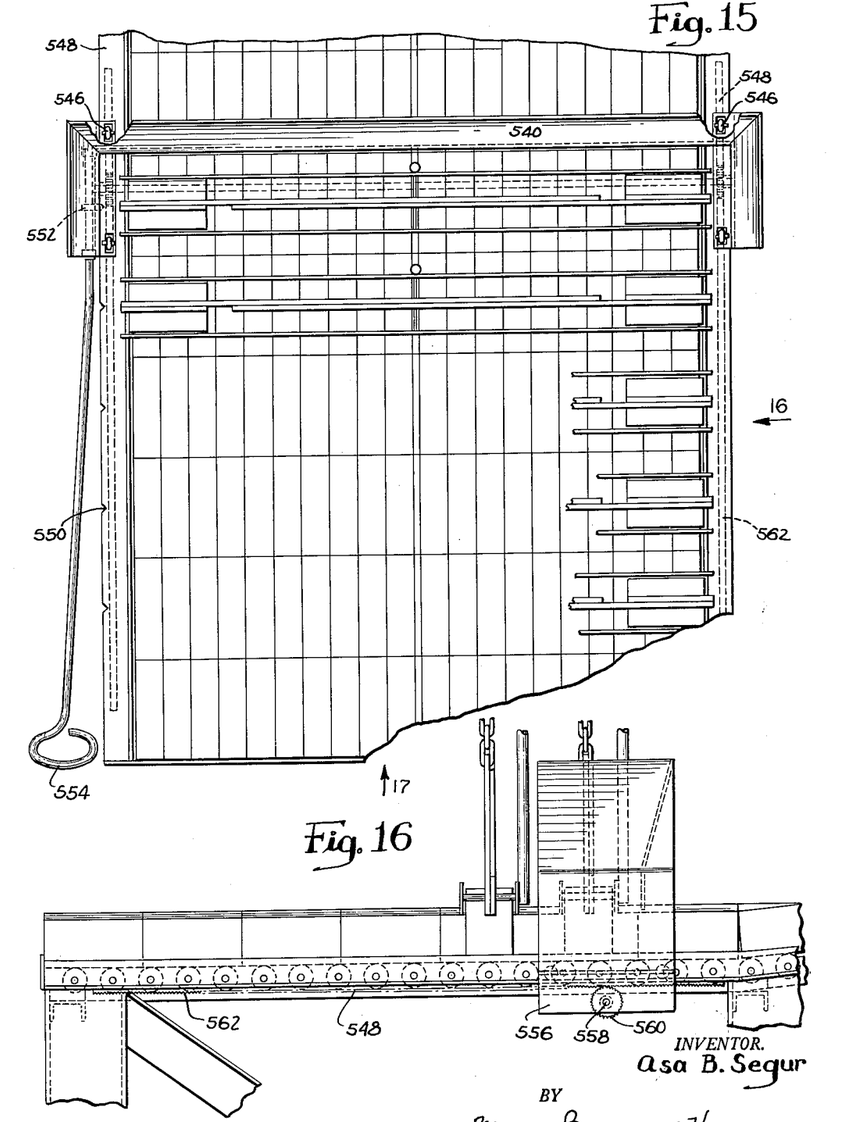
FIG. 15 is an enlarged plan view of the novel tongs and guide therefor at the loading station.
FIG. 16 is a side-elevation of the apparatus shown in FIG. 15 looking in the direction of the arrow 16 of FIG. 15.

Referring particularly to FIGS. 15 and 16, it will be seen that the guide 540 is mounted on rollers 546 so that the guide may be moved lengthwise of the loading platform. The rollers are supported on angle irons 548 forming part of the framework of the loading platform, and one of these angle irons is provided with notches 550 adapted to be engaged by a locking pin 552 controlled by rotating a handle 554. This handle may also be utilized to pull the guide 540 lengthwise of the loading platform. The sides of the guide 540 have lower ends 556 which project downwardly below the angle irons 548 and carry a cross shaft 558 having gears 560 engaging racks 562 attached beneath the angle irons 548. The gears 560 and racks 562 maintain the guide 540 normal to the longitudinal axis of the loading platform, and the downwardly extending ends 556 engage the angle irons 548 to prevent lateral shifting of the guide 540 relative to the loading platform.

I have determined that the standard truck body will not take an even number of tiers twenty bricks wide when the body is loaded to capacity and that the last tier can be only ten bricks wide. This is the reason for the dividers 508 in the gang tongs 464. In order to load a tier ten bricks wide, the operator moves the guide 540 backwardly out of operative position and pulls down on handle 528 to permit trolley 470 to move inwardly on the crane arm 474. The gang tongs are then lowered to the platform with only the right-hand half of the tongs engaging the left-hand ten rows of brick, as viewed in FIGS. 11, 15 and 17. Six rows of ten bricks each are thus picked up by the tongs and the brace 500 prevents the unbalanced weight in the tongs from tipping these tongs beyond a predetermined limit. The tongs are then moved to position over the truck body and the loading of this narrow tier of brick is commenced. When the crane is returned to position over the loading platform, the trolley is returned to the position shown in FIG. 14 so that the tongs now will pick up the remaining half of the twenty-brick columns left on the loading platform. These operations are continued until the narrow tier is completed, whereupon the marker 534 is unclamped from the truck body and the loaded truck can be on its way.

A single operator standing on the truck body can load a standard-size truck in the foregoing manner in a matter of only ten minutes, whereas by the conventional procedure presently in use, loading of such a truck takes between one and one-and-a-half hours. In addition to the increase in speed there is less loss from damage in the loading operation, and because of the superior and more uniform loading of the truck, there is less likelihood that movement of the truck over the road will dislodge or damage any of the bricks.

Figure 3B:
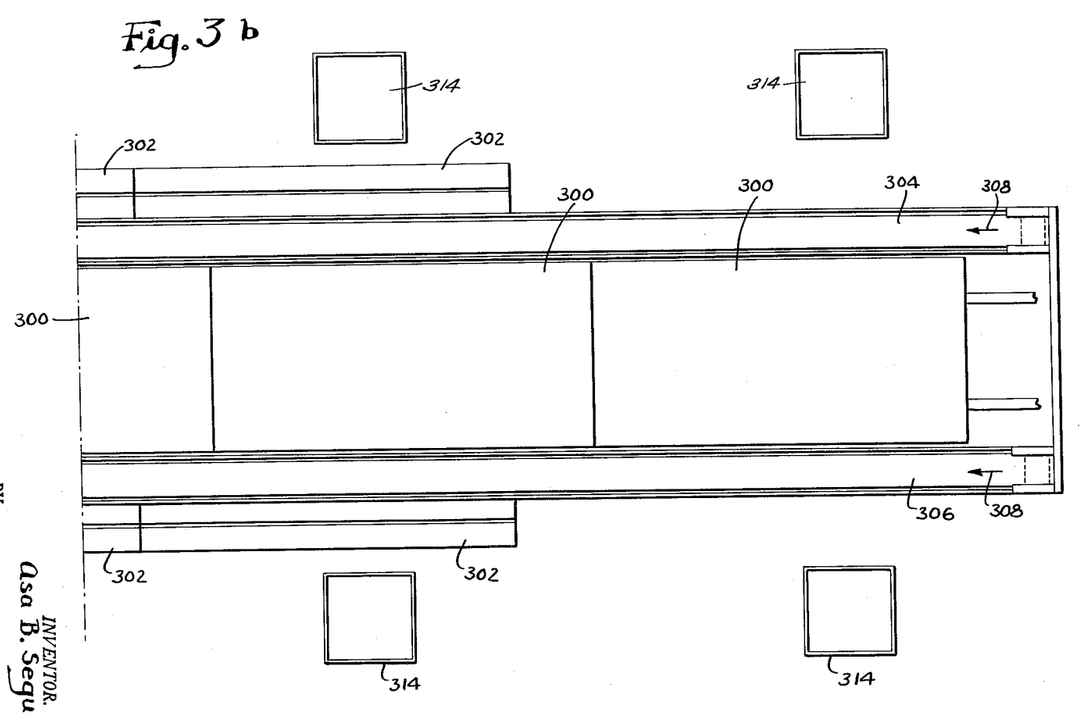

In FIGS. 3a and b and other related figures I have shown an unloading or drawing station for tunnel kiln cars and consolidating means for combining the brick delivered by the conveyor belts on opposite sides of the cars and rearranging such brick into a broad stream twenty bricks wide for delivery to the loading platform. In briefly describing the alternative system shown in FIG. 2, I have mentioned that the scove kiln cars are unloaded at the kiln rather than subsequent to the firing operation. After the bricks in the scove kiln have been properly fired, it also is essential to unstack or draw these bricks, and this may be conducted in essentially the same way and by apparatus similar to that used in unloading tunnel kiln cars.

The face of the stacked brick in the scove kiln presents essentially the same unloading problem as the tunnel kiln cars of fired brick which are unloaded by interposing an endless conveyor between the workman and the brick to be unloaded, with the conveyor and workman both at the optimum position to facilitate unloading without stooping or bending and by short direct movements which pull the brick from the stack onto the conveyor immediately in front of the workman. In FIG. 2 I have indicated such a conveyor by reference letter P, and such conveyor may be associated with a vertically movable platform (see FIGS. 4 and 5 of my Patent 2,748,957) so that the workman and conveyor can always be positioned at the most advantageous height. From the conveyor P the bricks can be transported to an accumulating and consolidating station similar to that used in the first embodiment, and from there to a loading station similar to or identical with the loading station of the first embodiment.

While I have referred to the brick blanks as being cured by firing in a kiln, blanks for brick or like ceramic articles are frequently cured by simply drying, and in some climates this can be accomplished in the open. My system contemplates firing in a kiln, drying in the open, or other procedures for curing the stacked blanks.

From the foregoing description of illustrative embodiments of my invention, it will be apparent that my novel system accomplishes the objects hereinbefore set forth and that both my system and various features thereof are new an constitute important advances in the art.

It is to be understood that my invention is not to be limited to details herein illustrated or described, but includes all modifications, variations, and equivalents coming within the scope of the appended claims.

I claim:

1. In apparatus for handling, inspecting, and assembling brick into consolidated rows ready for shipment, the combination of a table adapted to support a plurality of rows of brick arranged in a plurality of layers, a platform adjacent the table and adapted to support an operator, a conveyor having a movable transport surface passing between the operator and the brick on the table, with the width dimension of said transport surface being of the same order of magnitude as the width dimension of a row so that the operator can reach across the transport surface and simultaneously inspect and draw a row of brick from the table onto the transport surface, means for adjusting the relative heights of the table, the conveyor transport surface and the platform to enable the operator to maintain a given position with respect to the conveyor transport surface and with respect to the brick being inspected and drawn from the table, accumulator means having a freely movable brick-supporting surface arranged endwise of and in article-receiving relation to the conveyor transport surface for movement in response to successive arrival of brick delivered thereto by said transport surface to consolidate a predetermined number of brick into a group, and means responsive to the arrival at said accumulator and consolidation into a group by said accumulator of said predetermined number of brick for removing said group from said accumulator.

2. The arrangement of claim 1 wherein said accumulator includes an output conveyor surface movable in a direction generally normal to the direction of movement of said transport surface, said conveyor surface being movable in response to engagement with groups of brick successively delivered thereto, and the removing means of said accumulator includes reciprocable means responsive to the formation of each group on said conveyor surface to advance each group onto said conveyor surface along the direction of movement thereof to form the successive groups of brick into a consolidated stream of uniform width.

3. The arrangement of claim 1 wherein said conveyor includes abutment means projecting above the movable transport surface thereof along the side thereof adjacent said platform for engagement with corresponding ends of each brick of the row being transferred to act as an aligning stop that positions said ends in a substantially straight line extending in the direction of movement of the transport surface.

4. In apparatus for handling, inspecting and assembling brick into rows ready for shipment, the combination of a table adapted to support a plurality of rows of brick arranged in a plurality of layers, a pair of platforms flanking the table at opposite sides thereof and each adapted to support an operator, a conveyor at each side of the table and each having a moving transport surface passing between the operator and the brick on the table, with the width dimension of each of said transport surfaces being of the same order of magnitude as the width dimension of a row so that each operator can reach across the transport surface adjacent thereto and simultaneously inspect and draw a row of brick from the table onto the transport surface, means for adjusting the relative heights of the table, the conveyor transport surfaces and the platforms to enable the operator to maintain a given position with respect to the conveyor transport surfaces and with respect to the brick being inspected and drawn from the table, and accumulator means having separate, freely movable, brick-supporting surfaces arranged endwise of and in article-receiving relation to each transport surface for movement in response to successive arrival of brick delivered thereto by said transport surfaces to arrange a predetermined number of brick into separate consolidated groups and means responsive to the arrival at said accumulator means and arrangement into separate consolidated groups by said accumulator means of said predetermined number of brick for simultaneously removing a number of consolidated brick from each of said brick-supporting surfaces.

5. The arrangement of claim 4 wherein said accumulator means includes an output conveyor surface adjacent to each of said brick-supporting surfaces and responsive to engagement with brick successively delivered thereto to move in a direction generally normal to the direction of movement of said transport surfaces, and the removing means of said accumulator means includes means responsive to the formation of said separate consolidated groups on said brick-supporting surfaces to advance a consolidated group of brick from each of said brick-supporting surfaces onto said output conveyor surface along the direction of movement thereof to form consolidated streams of multiple-brick width.

6. In apparatus for handling, inspecting, and assembling brick into consolidated rows ready for shipment, the combination of a table adapted to support a plurality of rows of brick arranged in a plurality of layers, a platform adjacent the table and adapted to support an operator, conveyor means for moving brick in alignment in a predominantly horizontal direction and having a brick-supporting surface extending between the place for the operator and the brick on the table, with the width dimension of said surface being of the order of magnitude of the width dimension of a row so that an operator can reach across said surface and simultaneously inspect and draw a row of brick from the table onto the supporting surface, means for adjusting the relative heights of the table, the supporting surface and the platform to enable an operator to maintain a given position with respect to the supporting surface and with respect to the brick being inspected and drawn from the table, accumulator means for receiving brick from said supporting surface and having a brick-receiving surface arranged endwise of and in article-receiving relation to said supporting surface, said accumulator means including means responsive to the successive delivery of brick to said receiving surface for consolidating a group of brick on said receiving surface, said group comprising a predetermined number of brick delivered from said supporting surface to said receiving surface by said conveyor means, and means responsive to the arrival at said accumulator and the consolidation into a group by said accumulator of said predetermined number of brick for removing said group from said accumulator.

7. The arrangement of claim 6 wherein said conveyor means includes abutment means projecting above said supporting surface along the side thereof adjacent said platform for engagement with corresponding ends of each brick of the row being transferred to act as an aligning stop that positions said ends in a substantially straight line extending in a direction lengthwise along the supporting surface.

8. The arrangement of claim 6 wherein said conveyor means includes abutment means projecting above said supporting surface along the side thereof adjacent said table for tripping engagement against the corresponding ends of each brick of the row being transferred to serve as a rotation guide aiding manual turning of said row.

9. The arrangement of claim 6 wherein said conveyor means includes abutment means projecting above said supporting surface along each side thereof, with the abutment means adjacent the table being engageable against corresponding ends of each brick of the row being transferred to serve as a rotation guide aiding manual turning of said row and with the abutment means adjacent the platform being engageable with corresponding ends of each brick of the row being transferred to act as an aligning stop that positions the brick in a substantially straight line extending in a direction lengthwise along the supporting surface.

10. In apparatus for assembling brick or like articles into consolidated rows ready for shipment, a conveyor having an endwise movable brick-transporting surface and accumulator means having a number of freely movable parallel extending transversely spaced apart brick-supporting surfaces arranged endwise of and in brick-receiving relation to the brick-transporting surface for movement in response to successive arrival thereat of brick delivered thereto by said brick-transporting surface to consolidate a predetermined number of brick into a group, and means responsive to the arrival at said accumulator and consolidation into a group by said accumulator of said predetermined number of brick for removing a number of consolidated brick from said brick-supporting surfaces, said last named means comprising a plurality of horizontally spaced-apart idler rollers disposed beneath said transversely spaced apart brick-supporting surfaces and having their axes of rotation extending parallel to the direction of movement of said transversely spaced apart brick-supporting surfaces, said rollers being movable vertically between said transversely spaced apart brick-supporting surfaces to engage brick thereon and elevate such brick thereabove, a horizontally movable plunger disposed at the height to which said brick are elevated by said rollers, and electrical control means including a switch actuated in response to the consolidation of said predetermined number of brick for controlling said rollers and said plunger to first move the rollers upwardly between said transversely spaced apart brick-supporting surfaces and to then actuate the plunger to move in a horizontal direction generally normal to the direction of movement of said spaced apart surfaces for removing said number of consolidated brick from said rollers.

References Cited in the file of this patent

UNITED STATES PATENTS

| | | |
|---|---|---|
| 1,192,561 | Reiser | July 25, 1916 |
| 1,366,169 | Davis | Jan. 18, 1921 |
| 1,691,881 | Fuller | Nov. 13, 1928 |
| 1,764,153 | Cramer | June 17, 1930 |
| 1,871,393 | Shroyer | Aug. 9, 1932 |
| 2,090,129 | Kimball et al. | Aug. 17, 1937 |
| 2,470,795 | Socke | May 24, 1949 |
| 2,681,724 | Coffman | June 22, 1954 |
| 2,698,693 | Nordquist | Jan. 4, 1955 |